United States Patent
Kitani et al.

(10) Patent No.: US 6,192,198 B1
(45) Date of Patent: *Feb. 20, 2001

(54) CAMERA CAPABLE OF PRINT FORMAT SELECTION

(75) Inventors: Kazunari Kitani, Kawasaki; Takanori Kodaira, Yokohama; Masanori Ohtsuka, Yokohama; Hidetoshi Masuda, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/888,819

(22) Filed: Jul. 7, 1997

Related U.S. Application Data

(63) Continuation of application No. 08/724,920, filed on Oct. 2, 1996, now abandoned, which is a continuation of application No. 08/173,504, filed on Dec. 23, 1993, now abandoned.

(30) Foreign Application Priority Data

Dec. 25, 1992 (JP) .................................................. 4-346417
Dec. 28, 1992 (JP) .................................................. 4-358567

(51) Int. Cl.⁷ ........................... G03B 13/34; G03B 17/00

(52) U.S. Cl. .................................. 396/50; 396/60; 396/80; 396/122; 396/123; 396/147

(58) Field of Search ............................... 396/48, 60, 121, 396/122, 123, 124, 281, 287, 296, 435, 436, 50, 80, 147, 88, 311

(56) References Cited

U.S. PATENT DOCUMENTS

| | | | |
|---|---|---|---|
| 5,258,799 | * 11/1993 | Tanii et al. | 396/60 |
| 5,307,111 | * 4/1994 | Kurei | 396/123 |
| 5,321,460 | * 6/1994 | Yoshida | 396/109 |
| 5,345,285 | * 9/1994 | Hasushita et al. | 396/159 |
| 5,365,302 | * 11/1994 | Kodama | 396/121 |

* cited by examiner

Primary Examiner—Alan A. Mathews
(74) Attorney, Agent, or Firm—Robin, Blecker & Daley

(57) ABSTRACT

A camera capable of print format selection includes a connecting unit for responding to at least one of a unit for forming information for focus adjustment on the basis of one of distance measurement information of a plurality of portions in a scene and defocus information, and a unit for different print formats, thereby affecting an operation related to at least the other unit, or includes a connecting unit for responding to at least one of a unit for a predetermined distance range and a unit for different print formats, thereby affecting an operation related to at least the other unit.

16 Claims, 15 Drawing Sheets

PHOTOGRAPHING WITH PANORAMA SIZE IN VERTICAL POSTURE

FOCAL LENGTH SHORT ←→ FOCAL LENGTH LONG

△ WEIGHTING OF DISTANCE MEASURING DATA SLIGHT SMALL

○ WEIGHTING OF DISTANCE MEASURING DATA SMALL

◎ WEIGHTING OF DISTANCE MEASURING DATA LARGE

FIG. 10
FULL SIZE PHOTOGRAPHING SCENE
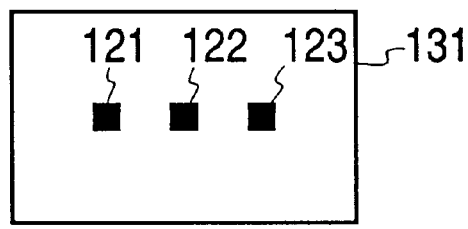
PANORAMA SIZE PHOTOGRAPHING SCENE
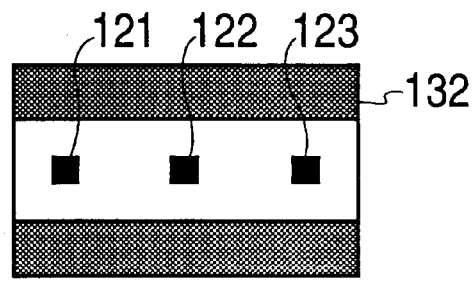
FIG. 11
PHOTOGRAPHING IN VERTICAL POSTURE
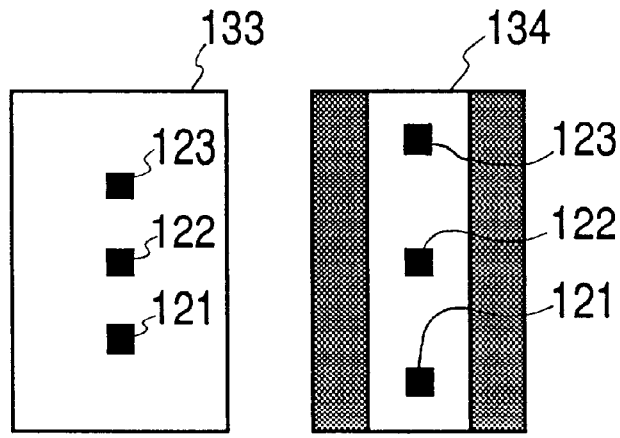
PHOTOGRAPHING IN FULL SIZE
PHOTOGRAPHING IN PANORAMA

CAMERA CAPABLE OF PRINT FORMAT SELECTION

This is a continuation application under 37 CFR 1.62 of prior application Ser. No. 08/724,920, filed Oct. 2, 1996, abandoned which is a continuation of Ser. No. 08/173,504, filed Dec. 23, 1993, abandoned.

BACKGROUND OF THE INVENTION

1. Field of the Invention

The present invention relates to an improvement in a camera including a format selecting means for selecting a given one of full size photographing and photographing in a print format different from the full size.

2. Related Background Art

Recently, a camera capable of photographing in a print format (panorama size) different from a normal full size, such as panorama photographs, has been put into practical use. A photographer can perform selection between a normal full size and an arbitrary scene size in the same camera by selecting this size.

On the other hand, there is provided a camera by which distances to a plurality of positions within an angle of view at which photographing is to be performed can be measured by a distance measuring device. In an active device of this sort, the direction of a projected beam corresponds to a distance measuring position. A plurality of light projection elements are fixed in different directions, and position detection elements (PSD) corresponding to the individual directions are arranged. This makes it possible to measure distances to a plurality of positions.

If photographing in different print formats is possible in the camera capable of measuring distances to a plurality of positions, however, the same distance measuring point selection scheme as in full size photographing is also used in panorama size photographing. This results in the following problems.

1) A distance measuring point for a photographing angle of view is set at a position where it is assumed on the basis of data of conventional full size photographing that a probability of the presence of a principal object to be photographed is high. In a practical situation, therefore, in panorama size photographing which is different in photographing magnification, the distance measuring point is not located at an appropriate position; the distance measuring point is located on a background or the like rather than the principal object to be photographed.

2) An operating means for determining a driving direction and a driving amount of a focusing lens on the basis of data obtained by measuring distances to individual distance measuring points, i.e., an operating means for calculating a point which is to be focused performs the operations in accordance with an operation method suitable for full size photographing in which a probability that an object to be photographed is present at the center of a scene is high. In panorama size photographing, a probability that a principal object to be photographed is present at the center of a scene is lower than that in full size photographing. Therefore, a distance measuring point other than the one at the center corresponds to a principal object to be photographed. In this case, even if proper distance measurement data is output, arithmetic operations are executed by the method suitable for full size photographing. Consequently, there is a high possibility that the operation result is determined by data corresponding to distance measurement for a background which is positioned at the distance measuring point at the center.

Of compact cameras incorporating a zoom lens, a camera in which a photographing optical system is changed for macro photographing on the most telephoto side is known. This camera can perform photographing corresponding to object distances within a predetermined range from the wide-angle side to the telephoto side in a normal zoom region. When a macro mode is set, the camera can photograph an object in a certain designated distance closer than the predetermined range.

FIG. 17 is a side view showing an optical system in such a macro photographing state, and FIG. 16 is a side view showing an optical system in a normal photographing state. The macro photographing state is set when a photographic lens barrel 812 is extended forward farther than in the normal photographing state. Referring to FIGS. 16 and 17, the camera consists of viewfinder objective lenses 808 and 809, a photographing scene changing mechanism 804, a viewfinder field frame 804*a*, and a viewfinder eyepiece 811.

In a camera in which a photographing optical axis and a viewfinder optical axis are arranged apart from each other, as in the compact camera incorporating a zoom lens as shown in FIGS. 16 and 17, a shift is present between a photographing field 813 and a viewfinder field 807. A shift amount is of no problem when an object to be photographed is in a middle or long distance. If, however, an object is at close range as in the macro mode, a scene viewed through a viewfinder is not photographed. Therefore, as shown in FIGS. 18 and 19, short distance correction marks 802*a*, 802*b*, and 802*c* are drawn in the viewfinder field 807, thereby designating the photographing field 813 at the closest focusing distance.

In the camera capable of photographing in different print formats described above, however, the field of the viewfinder is covered with the viewfinder field frame 804*a* in the panorama mode as shown in FIG. 19, forming a wide field of view corresponding to the range of panorama photographing. In this case, a photographing field in the macro mode (at the closest focusing distance) is as indicated by 814. Although the shift amount from the viewfinder field frame 804*a* remains unchanged, the ratio of a vertical shift increases because the photographing field is narrowed in the vertical direction. Therefore, as shown in FIG. 19, more than one-half of a scene viewed through the viewfinder is not photographed. That is, there is a large shift amount between a photographing scene that a photographer intends, i.e., a viewfinder field, and an actual photographing field.

SUMMARY OF THE INVENTION

The present invention has been made in consideration of the above situation and has as its object to provide a camera capable of print format selection, which can solve various problems posed when a camera is so designed as to be able to perform photographing in different print formats, such as a problem taking place in performing distance measurement for a plurality of positions in a scene, and a problem of a viewfinder parallax in a macro mode.

To achieve the above object, one aspect of the present invention provides a camera capable of print format selection comprising connecting means for responding to at least one of means for forming information for focus adjustment on the basis of one of distance measurement information of a plurality of portions in a scene and defocus information, and means for different print formats, thereby affecting an operation related to at least the other means.

Another aspect of the present invention provides a camera capable of print format selection comprising connecting means for responding to at least one of means for a predetermined distance range as in macrophotographing and means for different print formats, thereby affecting an operation related to at least the other means.

Other aspects of the present invention will become apparent from the following detailed description of the preferred embodiments.

BRIEF DESCRIPTION OF THE DRAWINGS

FIG. 10 is a view showing the relationship between a photographing field and each distance measuring point in full size photographing and panorama size photographing when photographing is performed in a lateral posture by the camera shown in FIG. 9;

FIG. 11 is a view showing the relationship between a photographing field and each distance measuring point in full size photographing and panorama size photographing when photographing is performed in a vertical posture by the camera shown in FIG. 9;

DETAILED DESCRIPTION OF THE PREFERRED EMBODIMENTS

The embodiments of the present invention will be described in detail below with reference to the accompanying drawings.

Figure 1:
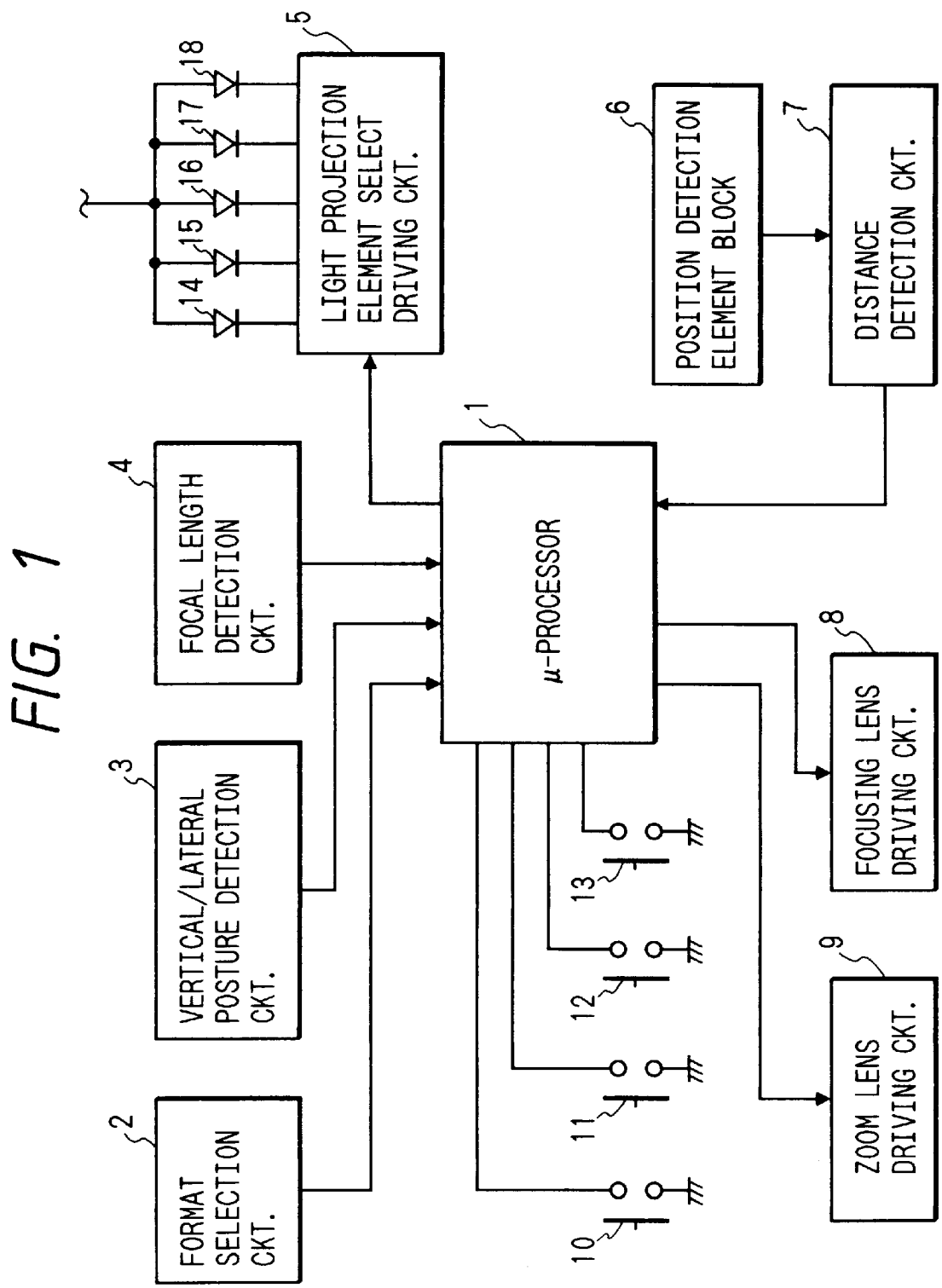
FIG. 1 is a block diagram showing a schematic arrangement of a camera including an active distance measuring device according to the first embodiment of the present invention.

FIG. 1 is a block diagram showing a schematic arrangement of a camera including an active distance measuring device according to the first embodiment of the present invention.

Referring to FIG. 1, a microprocessor 1 performs sequence control of the camera. A format selection circuit 2 selects a print format (a full size or a panorama size). A vertical/lateral posture detection circuit 3 detects the vertical posture or the lateral posture of a scene during photographing. A focal length detection circuit 4 detects the focal length of a photographic lens. A light projection element select driving circuit 5 selects light projection elements and drives them. Light projection elements 14 to 18 are so fixed to a camera main body as to project light components at respective predetermined angles with respect to the optical axis of the photographic lens.

A position detection element block 6 detects light components projected by the light projection elements 14 to 18 and reflected by an object to be photographed. A distance detection circuit 7 detects distance data of each light projection position on the basis of an output from the position detection element block 6. A focusing lens driving circuit 8 drives a focusing lens (not shown) for focusing. A zoom lens driving circuit 9 drives a zoom lens (not shown) for changing the focal length of the photographic lens. A switch (SW1) 10 is turned on by the first stroke of a shutter button, and a switch (SW2) 11 is turned on by the second stroke of the shutter button. A switch (TELE-SW) 12 is for driving the photographic lens toward a long-focal-length side, and a switch (WIDE-SW) 13 is for driving the photographic lens toward a short-focal-length side.

Figure 2:
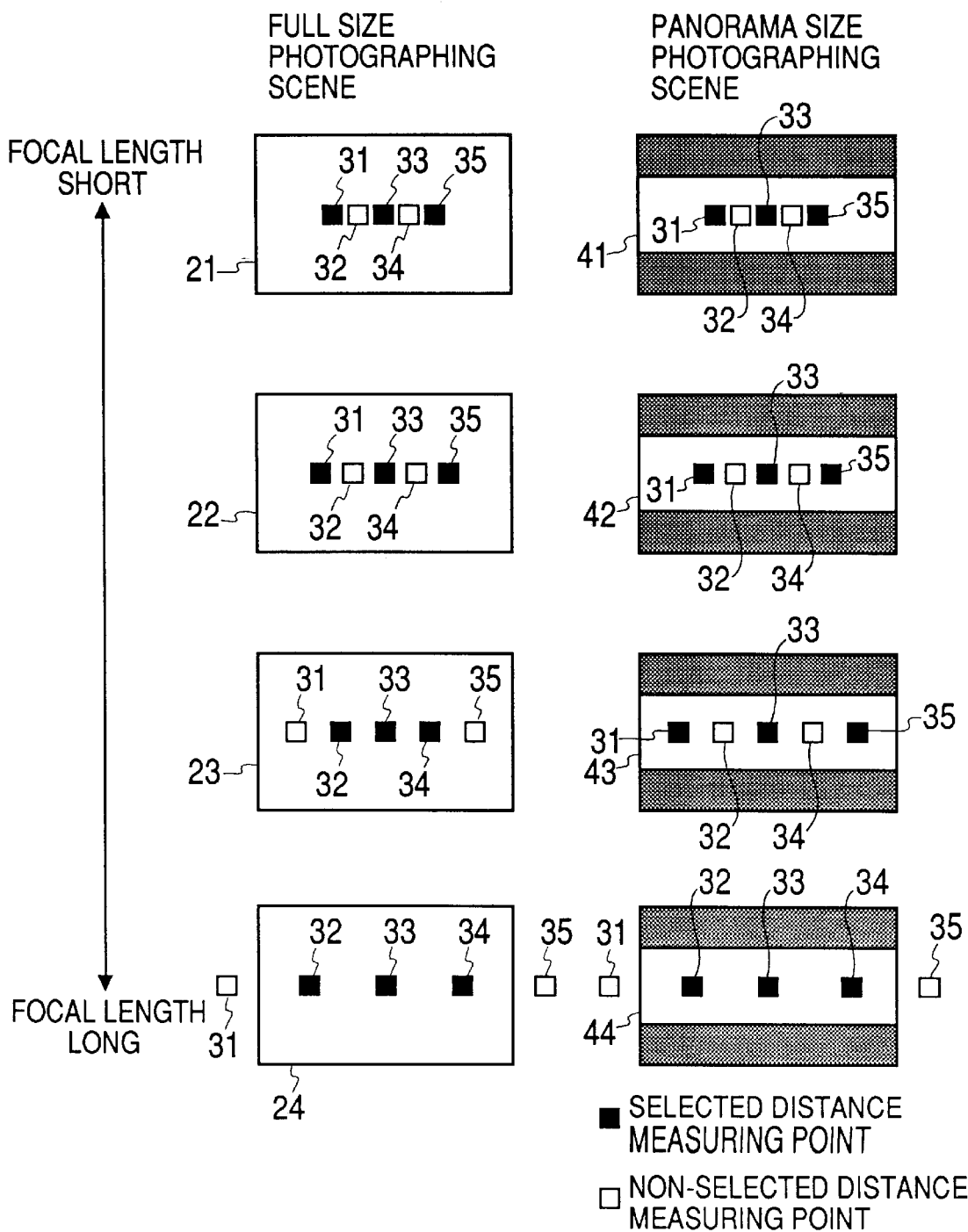
FIG. 2 is a view showing the relationship between a photographing field and each distance measuring point in full size photographing and panorama size photographing when photographing is performed in a lateral posture (the longer direction of scene is lateral) by the camera shown in FIG. 1.

FIG. 2 illustrates the relationship between the photographing scene and the positions of distance measuring points according to the first embodiment of the present invention.

Referring to FIG. 2, a field 21 indicates a photographing field (photographing scene) in the shortest focal length of the photographic lens of the camera in full size photographing. Fields 22 and 23 are photographing fields obtained when the photographic lens is driven toward the long-focal-length side. A field 24 is a photographing field in the longest focal length of the photographic lens in full size photographing. Points 31 to 35 represent the positions of projected beams, i.e., the distance measuring points.

Generally, the angles of projected beams are fixed because a number of demerits take place in cost and operational precision if the angles are variable in correspondence with the focal length of a photographic lens.

When the focal length of a photographic lens is changed, therefore, the position of distance measuring point in a photographing field changes relative to the change in focal length. This phenomenon is represented by the shifts of the positions of the distance measuring points in the photographing fields 21 to 24. It is understood from this movement that the distance measuring points 31 and 35 fall outside the photographing field 24.

In this embodiment, the number of distance measuring points, i.e., the number of light projection elements is five. In many instances, however, beams are projected onto three points by taking into account a time required for projection, effectiveness, complexity in arithmetic operations to be performed later, and the like.

In this embodiment, in full size photographing, the distance measuring points 31, 33, and 35 are selected when the focal length of the photographic lens corresponds to the photographing field 21 or 22, and the distance measuring points 32, 33, and 34 are selected when the focal length of the photographic lens corresponds to the photographing field 23 or 24, in order to arrange the distance measuring points at equal intervals as much as possible in a central portion of each photographing field.

In FIG. 2, ■ indicates a selected distance measuring point, and ☐ indicates a non-selected distance measuring point.

In panorama size photographing, in contrast, control is performed such that distances to points farther from the center than in full size photographing can be measured, since a probability that a principal object to be photographed is present at a position other than the central portion of a scene is higher than that in full size photographing.

That is, as illustrated on the right side of FIG. 2, the distance measuring points 31, 33, and 35 are chosen when the focal length of the photographic lens corresponds to one of photographing fields 41 to 43, and the distance measuring points 32, 33, and 34 are chosen only when the focal length corresponds to a photographing field 44.

Operations of the camera with the above arrangement will be described below.

A print format is selected by the format selection circuit 2, and the focal length of the photographic lens is set by using, e.g., the switches TELE-SW and WIDE-SW, thereby performing a ready operation of photographing. Thereafter, when the shutter button (not shown) is depressed to its first stroke, the switch SW1 is turned on.

The microprocessor 1 reads the result selected by the format selection circuit 2 and also reads the focal length of the photographic lens from the focal length detection circuit 4. If the microprocessor 1 determines that a detection result from the vertical/lateral posture detection circuit 3 indicates a lateral posture, the microprocessor 1 drives, on the basis of the print format and focal length data already read, the light projection element select driving circuit 5 to selectively cause the light projection elements 14 to 18 to project light such that either the combination of 31, 33, and 35 or the combination of 32, 33, and 34 is obtained as light projection positions, as shown in FIG. 2.

The beams projected by the selected individual light projection elements are reflected by an object to be photographed and incident on the position detection element block 6. On the basis of data obtained by the position detection element block 6, the distance detection circuit 7 calculates distance measurement data of each distance measuring point and transfers the data to the microprocessor 1. The microprocessor 1 carries out operations on the basis of the data corresponding to each distance measuring point, determining an amount and a direction in which the focusing lens is actually driven.

When the shutter button is further depressed to turn on the switch SW2, the microprocessor 1 drives the focusing lens driving circuit 8 in accordance with the above operation result and performs exposure to the film surface by using an exposing means (not shown). Subsequently, the microprocessor 1 feeds the film to take up the exposed frame by using a film feeding means (not shown) and waits until the shutter button is released. When the shutter button is released, the microprocessor 1 again waits until the switch SW1 is turned on.

If, for example, the result selected by the format selection circuit 2 indicates a panorama size and the detection result from the vertical/lateral posture detection circuit 3 indicates a vertical posture, a light projection element for a distance measuring point located in the lower portion of a photographing scene is not chosen.

This is so because, in performing vertical posture photographing in a panorama mode, a distance measuring point in the lower portion of a photographing scene measures a short distance, such as a distance to the ground, in many cases. It is predicted that, if normal data processing is executed in this case, an object closer to the closest focusing distance side than to a principal object to be photographed is focused under the influence of distance measurement data from this distance measuring point.

This state of photographing will be described with reference to FIG. 3.

Figure 3:
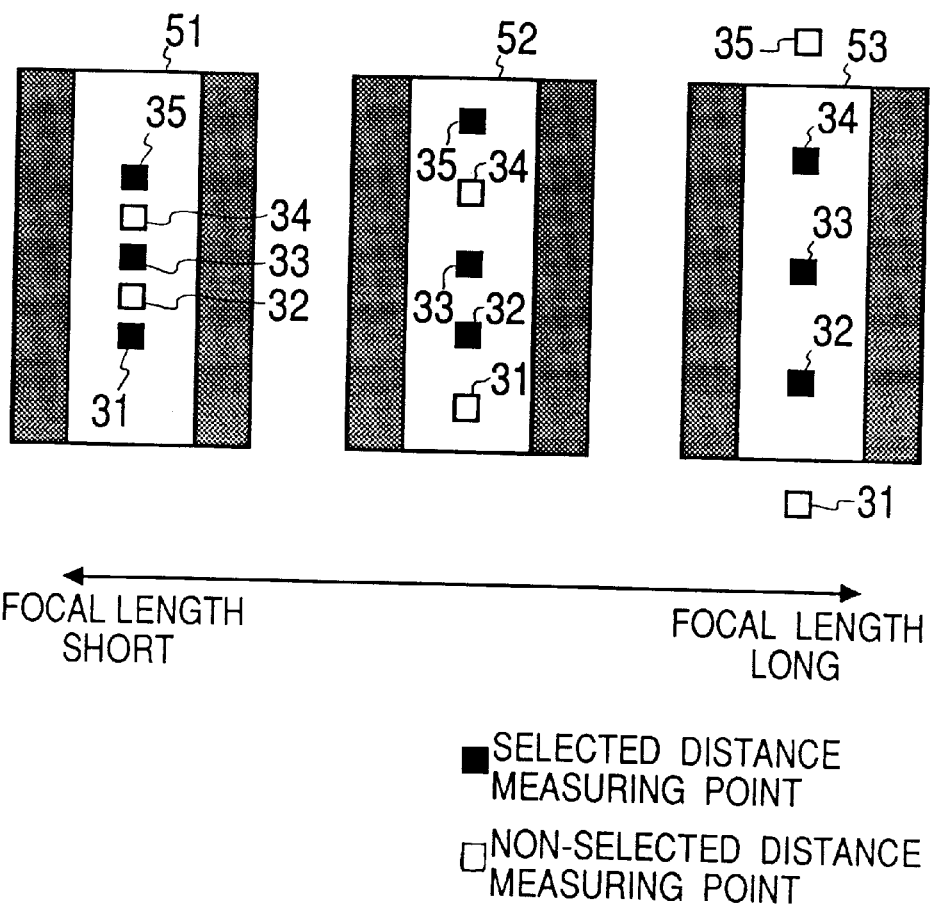
FIG. 3 is a view showing the relationship between a photographing field and each distance measuring point in full size photographing and panorama size photographing when photographing is performed in a vertical posture (the longer direction of scene is vertical) by the camera shown in FIG. 1.

Referring to FIG. 3, a field 51 shows a photographing field in the shortest focal length of the photographic lens of the camera. Fields 52 and 53 indicate photographing fields obtained when the photographic lens is moved toward the long-focal-length side. Points 31 to 35 are distance measuring points as in the case of a lateral posture.

When the photographing field 51 is set, it is determined that no adverse effect is present in this vertical posture because the distance measuring points are located near the center. Therefore, as in the case of the lateral posture, the distance measuring points 31, 33, and 35 are selected.

When the focal length is increased to set the photographing field 52, in which field the distance measuring points 31, 33, and 35 are chosen in the lateral posture, the distance measuring point 31 is located in a rather lower portion of the scene in this vertical posture. Since this increases a possibility that a distance to an object which a photographer does not expect is measured, the distance measuring point 32 rather than the distance measuring point 31 is chosen.

When the focal length is further increased to set the photographing field 53, the distance measuring point 31 falls outside the photographing field, and so the distance measuring point 32 is selected. In this case, it is determined that it is safe to select the distance measuring point 32 because the distance measuring point 32 is close to the center of the photographing field. The influence of this selection depends upon particularly the focal length of the photographic lens and the arrangement of the distance measuring points in the photographing scene. It is therefore most effective to determine whether a given distance measuring point is to be selected in accordance with both the data of the focal length of the photographic lens and the vertical posture detection result.

Figure 4:
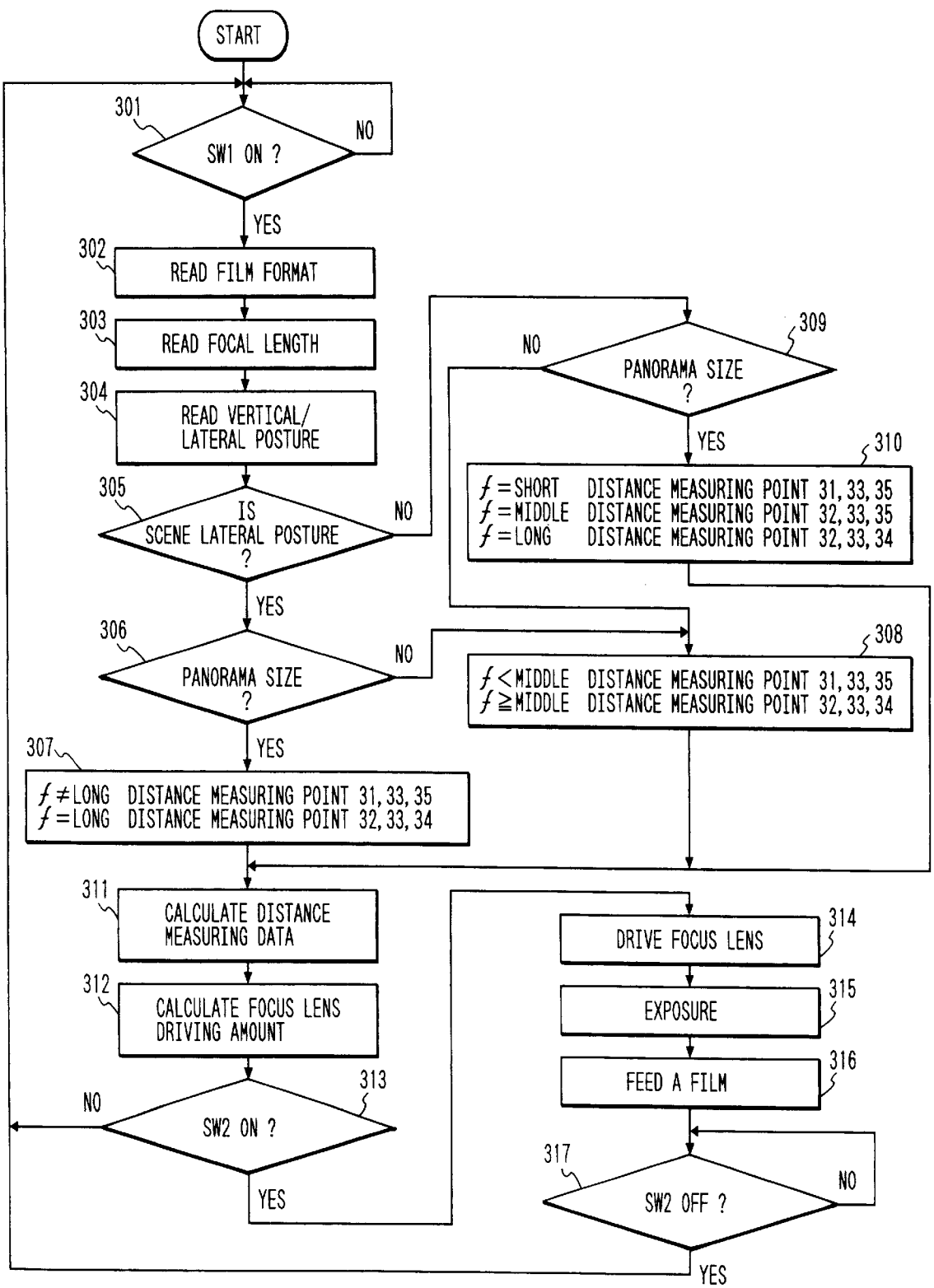
FIG. 4 is a flow chart showing a series of operations of the camera shown in FIG. 1.

Steps 301 to 317 of a flow chart shown in FIG. 4 explain a series of operations of the camera described above.

Figure 5:
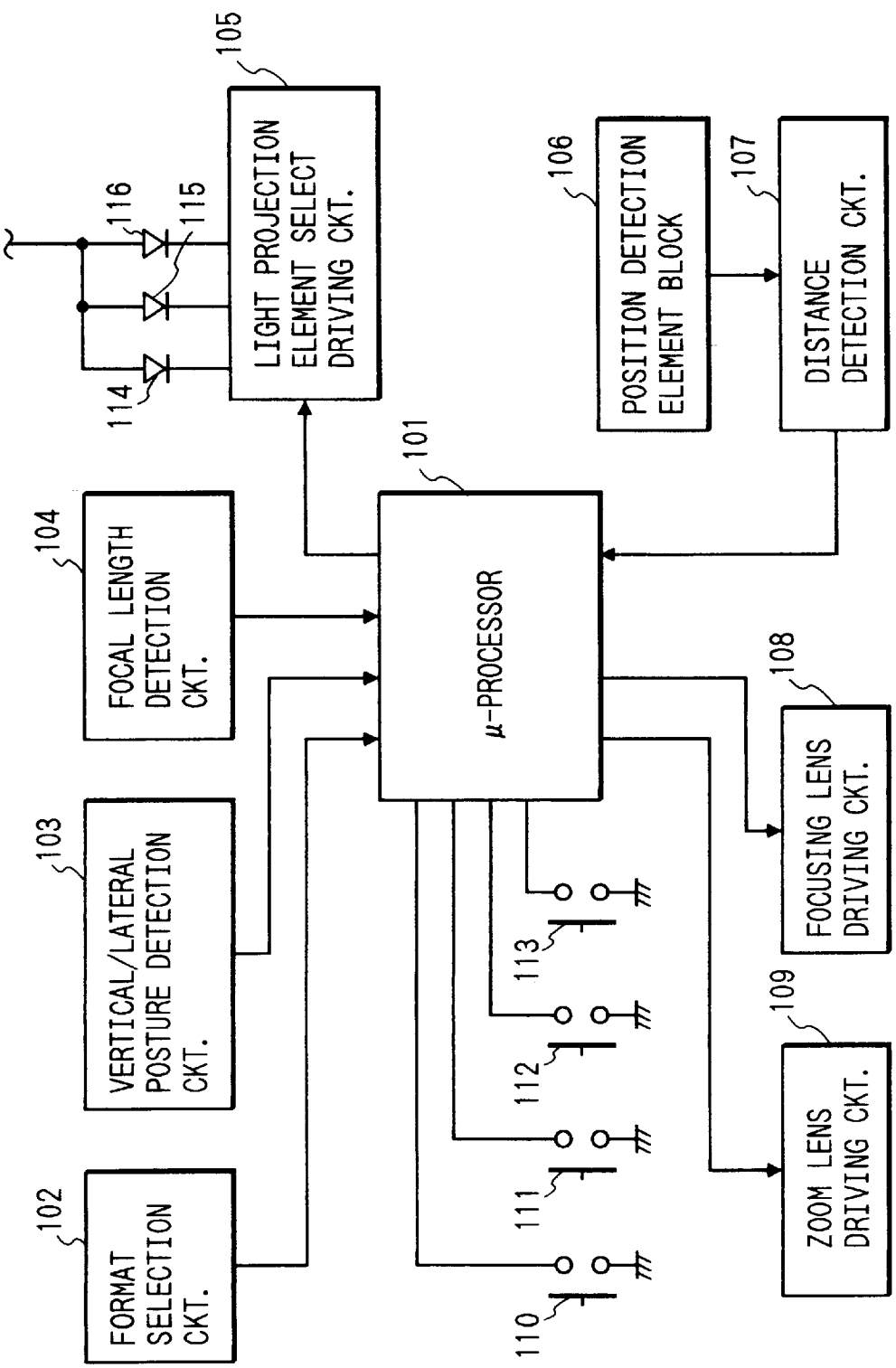
FIG. 5 is a block diagram showing a schematic arrangement of a camera including an active distance measuring device according to the second embodiment of the present invention.

FIG. 5 is a block diagram showing a schematic arrangement of a camera including an active distance measuring device according to the second embodiment of the present invention, which illustrates a circuit for carrying out the second embodiment of the present invention.

Referring to FIG. 5, a microprocessor 101 performs sequence control of the camera. A format selection circuit 102 selects a print format (a full size or a panorama size). A vertical/lateral posture detection circuit 103 detects the vertical posture or the lateral posture of a scene during photographing. A focal length detection circuit 104 detects the focal length of a photographic lens. A light projection element select driving circuit 105 drives light projection elements. Light projection elements 114 to 116 are fixed to a camera main body so as to project light components at respective predetermined angles with respect to the optical axis of the photographic lens.

A position detection element block 106 detects light components projected by the light projection elements 114 to 116 and reflected by an object to be photographed. A distance detection circuit 107 detects distance data of each light projection position on the basis of an output from the position detection element block 106. A focusing lens driving circuit 108 drives a focusing lens (not shown) for focusing. A zoom lens driving circuit 109 drives a zoom lens (not shown) for changing the focal length of the photographic lens. A switch (SW1) 110 is turned on by the first stroke of a shutter button, and a switch (SW2) 111 is turned on by the second stroke of the shutter button. A switch (TELE-SW) 112 is for driving the photographic lens toward a long-focal-length side, and a switch (WIDE-SW) 113 is for driving the photographic lens toward a short-focal-length side.

Figure 6:
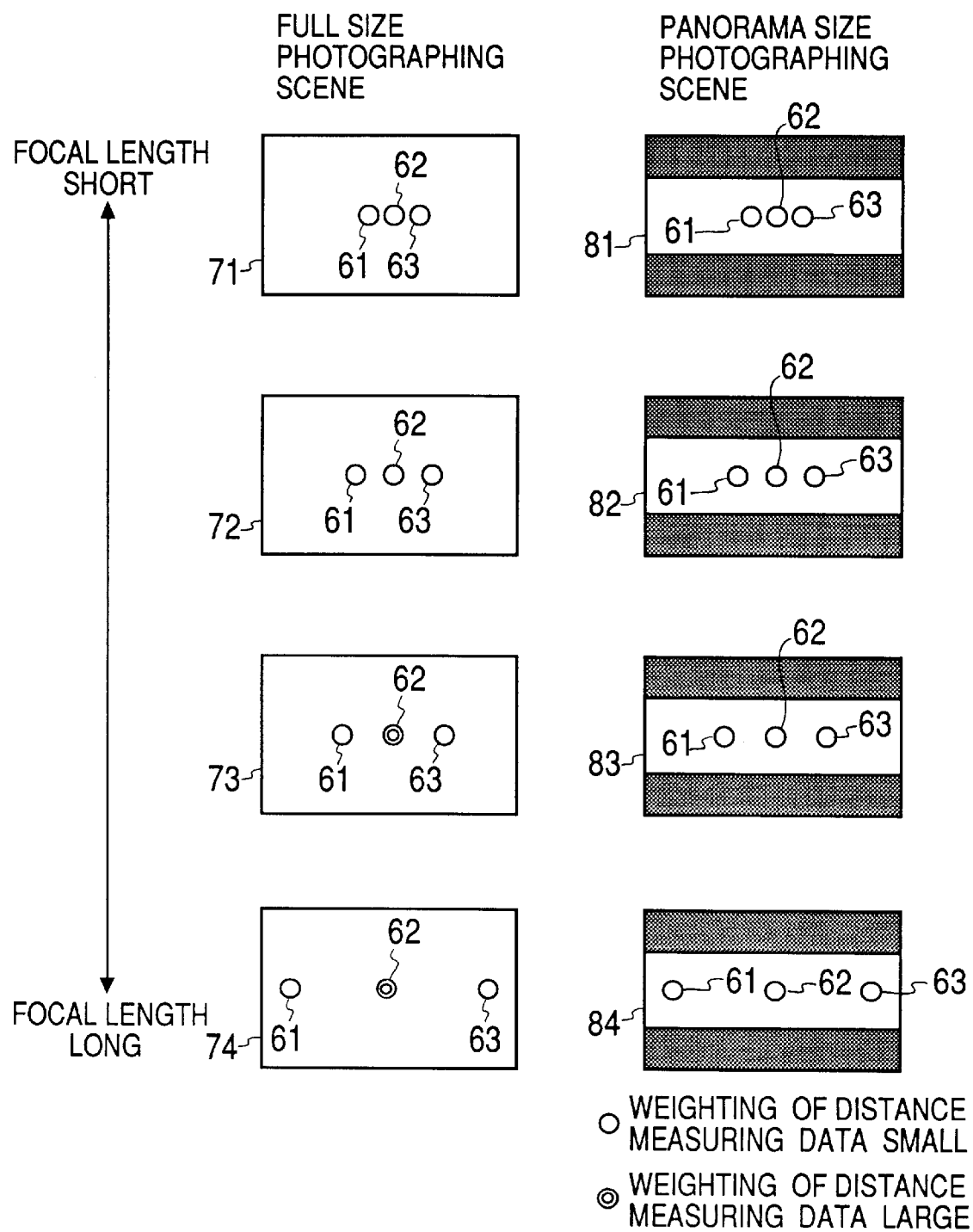
FIG. 6 is a view showing the relationship between a photographing field and each distance measuring point in full size photographing and panorama size photographing when photographing is performed in a lateral posture by the camera shown in FIG. 5.

FIG. 6 illustrates the relationship between the photographing scene and the positions of distance measuring points according to the second embodiment of the present invention.

Referring to FIG. 6, a field 71 indicates a photographing field (photographing scene) in the shortest focal length of the photographic lens of the camera in full size photographing. Fields 72 and 73 are photographing fields obtained when the photographic lens is driven toward the long-focal-length side. A field 74 is a photographing field in the longest focal length of the photographic lens in full size photographing. Points 61 to 63 represent the positions of projected beams, i.e., the distance measuring points.

When the focal length of a photographic lens is changed, the position of distance measuring point in a photographing field changes relative to the change in focal length. This phenomenon is represented by the shifts of the positions of the distance measuring points in the photographing fields 71 to 74.

In this embodiment, it is assumed that the number of distance measuring points is three in photographing of either size.

In FIG. 6, OOO represent weighting amounts for the individual distance measuring points when an amount and a direction in which the focusing lens is actually driven are calculated from data obtained at these points. OOO indicate that the data of the distance measuring points are processed evenly.

For example, when data indicating the shortest distance is to be selected from the data of the individual distance measuring points, the data obtained at these points are simply compared with one another. This is based on the assumption that these distance measuring points measure the distance to the same object to be photographed because the points are located close to the center of the photographing scene.

If the focal length is increased, on the other hand, the right and left distance measuring points move closer to the peripheries of the photographing scene. Therefore, weighting for these distance measuring points in the data operation is decreased compared to that for the central distance measuring point on the basis of the assumption that these points do not measure the distance to a principal object to be photographed except in some specific conditions. This is expressed by O⊙O.

In performing panorama size photographing, in contrast, a probability that a principal object to be photographed is present in a portion other than the central portion of a scene is increased. Therefore, weighting for distance measurement data of points apart from the center of the scene is increased to be larger than that in full size photographing.

In this embodiment, therefore, as illustrated on the right side of FIG. 6, weighting amounts for the data of the distance measuring points 61, 62, and 63 are given evenly throughout photographing fields 81 to 84 corresponding to the individual focal lengths of the photographic lens.

Operations of the camera with the above arrangement will be described below.

A print format is selected by the format selection circuits 102, and the focal length of the photographic lens is set by using, e.g., the switches TELE-SW and WIDE-SW, thereby performing a ready operation of photographing. Thereafter, when the shutter button (not shown) is depressed to its first stroke, the switch SW1 is turned on.

The microprocessor 101 reads the result selected by the format selection circuit 102, the focal length of the photographic lens from the focal length detection circuit 104, and a detection result from the vertical/lateral posture detection circuit 103. Subsequently, the microprocessor 1 drives the light projection element select driving circuit 105 to cause the light projection elements 114 to 116 to project light.

The beams projected by the individual light projection elements 114 to 116 are reflected by an object to be photographed and incident on the position detection element block 106. On the basis of data obtained by the position detection element block 106, the distance detection circuit 107 calculates distance measurement data at each distance measuring point and transfers the data to the microprocessor 101. The microprocessor 101 carries out operations on the basis of the data corresponding to each distance measuring point. In this case, the microprocessor 101 alters the operation method in accordance with FIG. 6 on the basis of the print format, the focal length of the photographic lens, and the information about the vertical or lateral posture already read. In this manner, an amount and a direction in which the focusing lens is actually driven are determined by the operation result obtained appropriately in accordance with the condition.

When the shutter button is further depressed to turn on the switch SW2, the microprocessor 101 drives the focusing lens driving circuit 108 in accordance with the above operation result and performs exposure to the film surface by using an exposing means (not shown). Subsequently, the microprocessor 101 feeds the film to take up the exposed frame by using a film feeding means (not shown) and waits until the shutter button is released. When the shutter button is released, the microprocessor 1 waits again until the switch SW1 is turned on.

If, for example, the result selected by the format selection circuit 102 indicates a panorama size and the detection result from the vertical/lateral posture detection circuit 3 indicates a vertical posture, different weighting from that in a lateral posture can be performed for the same reason as in the first embodiment.

This state of photographing will be described with reference to FIG. 7.

Figure 7:
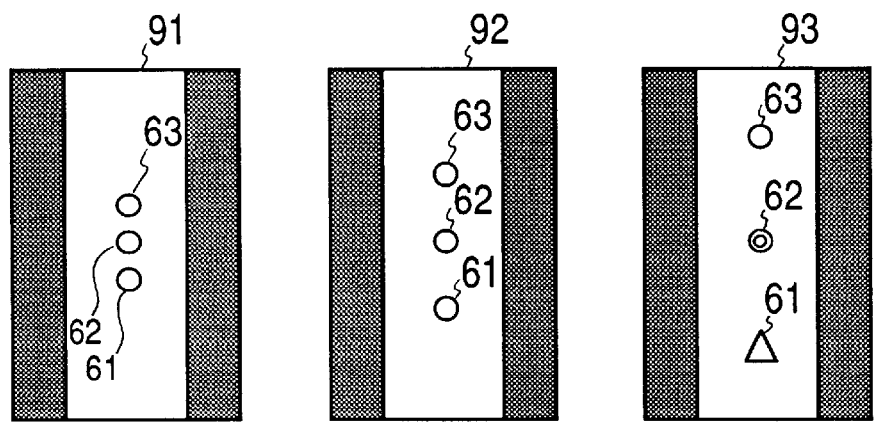
FIG. 7 is a view showing the relationship between a photographing field and each distance measuring point in full size photographing and panorama size photographing when photographing is performed in a vertical posture by the camera shown in FIG. 5.

Referring to FIG. 7, a field 91 indicates a photographing field in the shortest focal length of the photographic lens of the camera. Fields 92 and 93 indicate photographing fields obtained when the photographic lens is moved toward the long-focal-length side. Points 61 to 63 are distance measuring points like in the case of a lateral posture.

When the photographing field 91 or 92 is set, it is determined that no adverse effect is present in this vertical posture because the distance measuring points are located near the center. Therefore, as in the case of the lateral posture and the short focal length, data of the distance measuring points 61 to 63 are operated uniformly.

When the focal length is further increased to set the photographing field 93, in which field weighing amounts for the data of the distance measuring points 61, 62, and 63 are the same in the lateral posture, the distance measuring point 61 is located in a rather lower portion of the scene in this vertical posture. Since this increases a possibility that a distance to an object which a photographer does not expect is measured, the weighting amount for the data of the distance measuring point 61 is further decreased (indicated by Δ).

Figure 8:
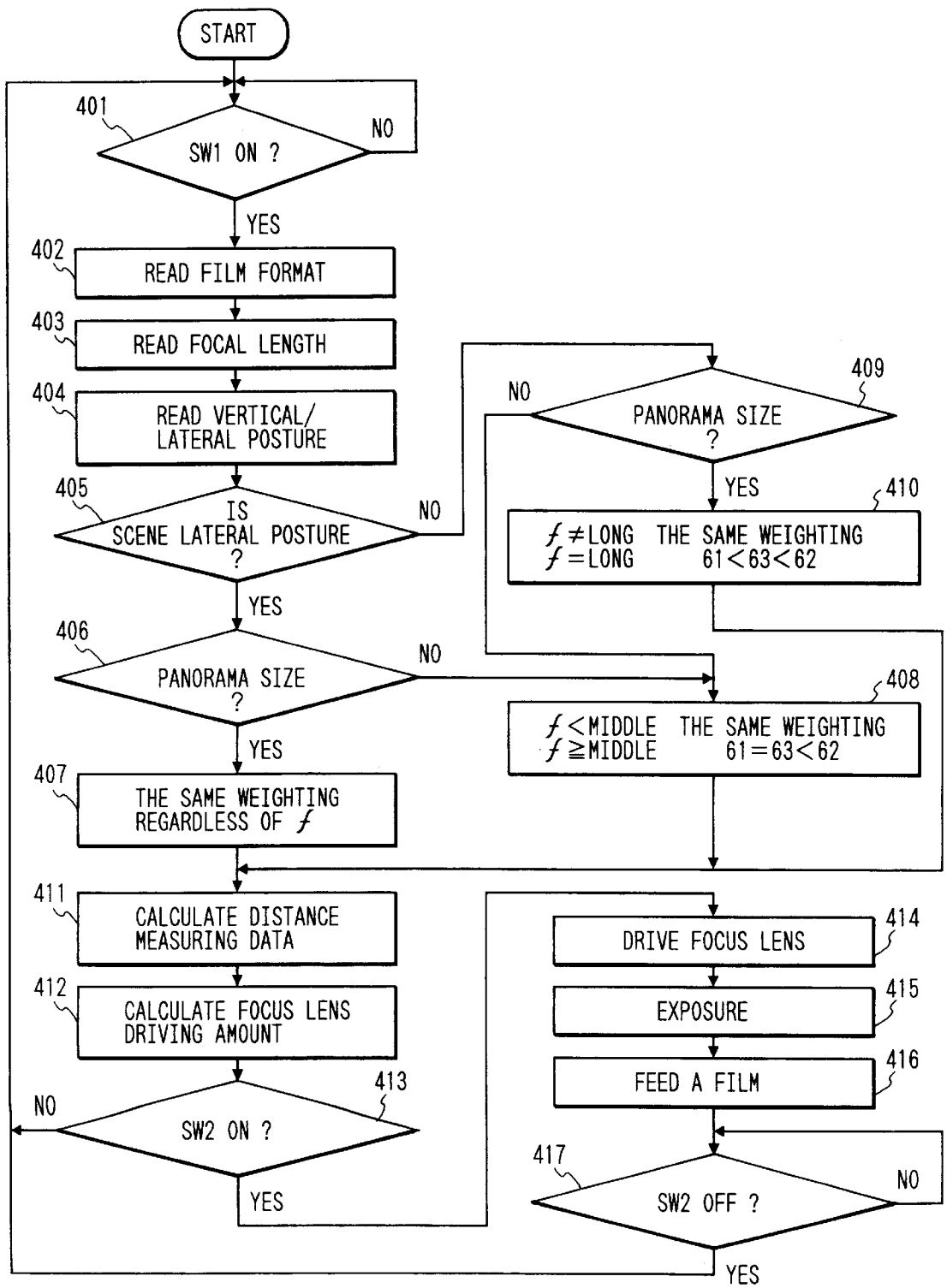
FIG. 8 is a flow chart showing a series of operations of the camera shown in FIG. 5.

Steps 401 to 417 of a flow chart shown in FIG. 8 explain a series of operations of the camera described above.

Figure 9:
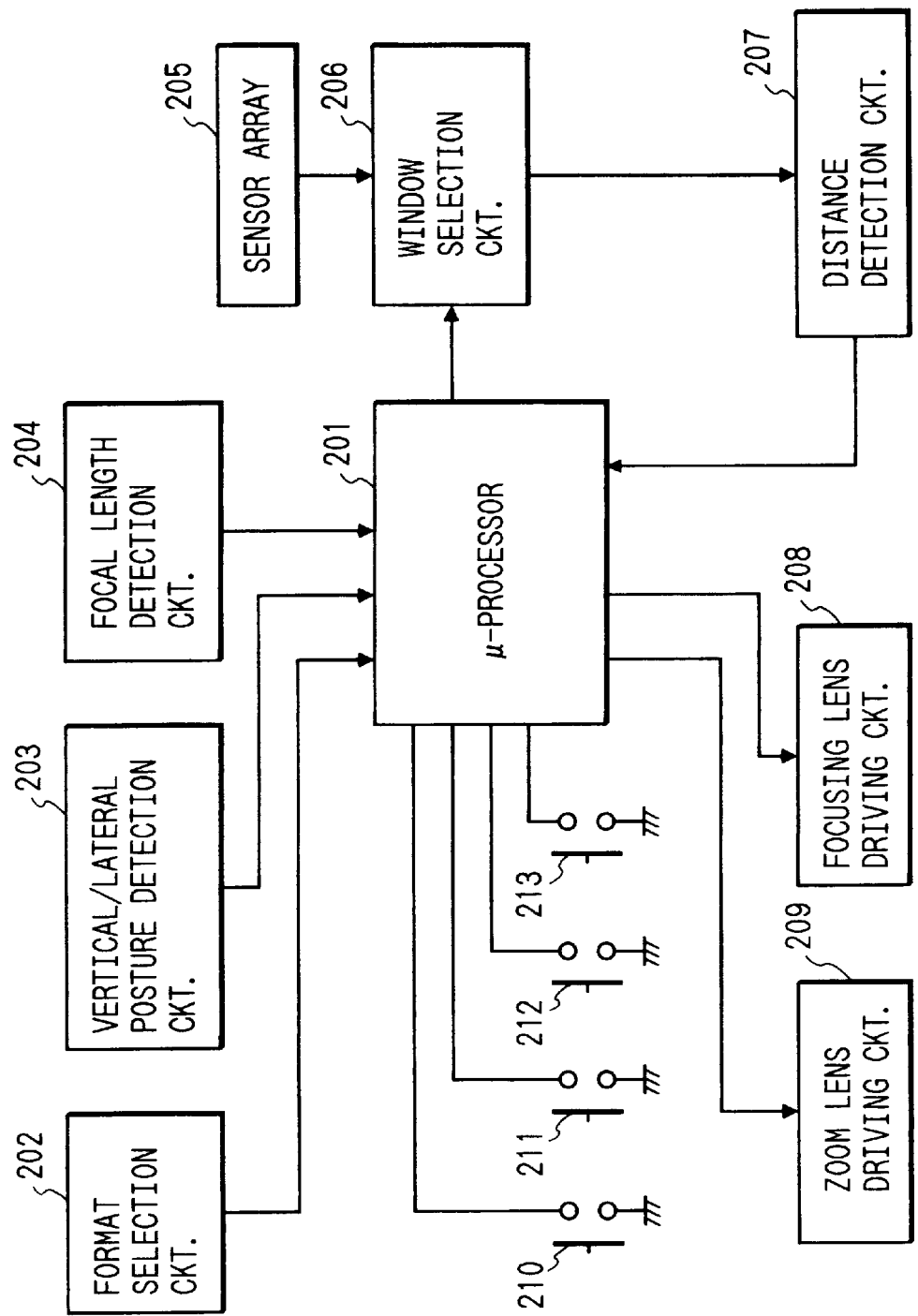
FIG. 9 is a block diagram showing a schematic arrangement of a camera including a passive distance measuring device according to the third embodiment of the present invention.

FIG. 9 is a block diagram showing a schematic arrangement of a camera including an external measurement type passive distance measuring device according to the third embodiment of the present invention.

Referring to FIG. 9, a microprocessor 201 performs sequence control of the camera. A format selection circuit 202 selects a print format (a full size or a panorama size). A vertical/lateral posture detection circuit 203 detects the vertical posture or the lateral posture of a scene during photographing. A focal length detection circuit 204 detects the focal length of a photographic lens. A sensor array 205 consists of a plurality of picture elements such as CCDs. A window selection circuit 206 selects a picture element range (to be referred to as a window hereinafter) so as to obtain an output from the sensor array 205. A distance detection circuit 207 detects distance data of each distance measuring point on the basis of the output from the sensor array 205 which is selected by the window selection circuit 206. A focusing lens driving circuit 208 drives a focusing lens (not shown) for focusing. A zoom lens driving circuit 209 drives a zoom lens (not shown) for changing the focal length of the photographic lens. A switch (SW1) 210 is turned on by the first stroke of a shutter button, and a switch (SW2) 211 is turned on by the second stroke of the shutter button. A switch (TELE-SW) 212 is for driving the photographic lens toward a long-focal-length side, and a switch (WIDE-SW) 213 is for driving the photographic lens toward a short-focal-length side.

FIG. 10 illustrates the relationship between the photographing scene (in a lateral posture) and the positions of distance measuring points according to the third embodiment of the present invention, in which a field 131 represents a photographing field in full size photographing.

When the focal length of the photographic lens is changed, the window selection circuit 206 switches the windows of the sensor array 205. This makes it possible to consistently set the distance measuring points at the same positions in a photographing scene regardless of the change in focal length of the photographic lens. This is the most significant difference of this passive distance measuring device from the active distance measuring device.

Points 121, 122, and 123 illustrated in the photographing field 131 indicate distance measuring points determined by a window which is selected in a given focal length in full size photographing.

In performing panorama size photographing, in contrast, a probability that a principal object to be photographed is present in a portion other than the central portion of a scene is increased. Therefore, control is so performed as to be able to measure points farther from the center than in full size photographing.

In this embodiment, therefore, as illustrated in a photographing field 131 on the right side of FIG. 10, the window selection circuit 206 moves the distance measuring points 121, 122, and 123 toward the peripheries of the photographing scene.

In addition, when photographing in a vertical posture is to be performed in a panorama size, a distance measuring point in the lower portion of the photographing scene measures a short distance, such as a distance to the ground, in many cases.

This state of photographing will be described with reference to FIG. 11.

Referring to FIG. 11, a field 133 indicates a photographing field in vertical posture photographing in a full size, and a field 134 indicates a photographing field in vertical posture photographing in a panorama size.

In panorama size photographing, distance measuring points are preferably arranged close to the peripheries of a scene. In photographing in vertical posture, however, a distance measuring point located in the lower portion of a scene measures a short distance, such as a distance to the ground, in many instances as mentioned above. It is predicted that, if normal data processing is executed in this case, an object closer to the closest focusing distance side than to a principal object to be photographed is focused under the influence of distance measuring data of that distance measuring point.

In performing vertical posture photographing in a panorama size, therefore, a distance measuring point located in the lower portion of a photographing scene is shifted toward the center of the photographing scene. That is, although the distance measuring point 121 is originally positioned at a location indicated by □ in panorama photographing, it is shifted to a position indicated by ■ in the direction (upward in FIG. 11) of the central portion of the photographing scene.

Operations of the camera with the above arrangement will be described below.

A print format is selected by the format selection circuits 202, and the focal length of the photographic lens is set by using, e.g., the switches TELE-SW and WIDE-SW, thereby performing a ready operation of photographing. Thereafter, when the shutter button (not shown) is depressed to its first stroke, the switch SW1 is turned on.

The microprocessor 201 reads the result selected by the format selection circuit 202, the focal length of the photographic lens from the focal length detection circuit 204, and a detection result from the vertical/lateral posture detection circuit 203.

If the print format selected by the format selection circuit 202 is a full size, the window selection circuit 206 is driven such that the distance measuring points in the photographing field are arranged as indicated by the points 121, 122, and 123 shown in FIGS. 10 and 11, regardless of whether the result detected by the vertical/lateral posture detection circuit 203 indicates a vertical or lateral posture, and the corresponding data of the sensor array 205 is applied to the distance detection circuit 207. On the basis of the data obtained from the sensor array 205, the distance detection circuit 207 calculates distance measuring data at each distance measuring point and transfers the data to the microprocessor 201. The microprocessor 201 carries out operations on the basis of the data corresponding to each distance measuring point, determining an amount and a direction in which the focusing lens is actually driven.

When the shutter button is further depressed to turn on the switch SW2, the microprocessor 201 drives the focusing lens driving circuit 208 in accordance with the above operation result and performs exposure to the film surface by using an exposing means (not shown). Subsequently, the microprocessor 101 feeds the film to take up the exposed frame by using a film feeding means (not shown) and waits until the shutter button is released. When the shutter button is released, the microprocessor 1 waits again until the switch SW1 is turned on.

If the result detected by the vertical/lateral posture detection circuit 203 indicates the lateral posture and the print format selected by the format selection circuit 202 is a panorama size, the window selection circuit 206 is so driven as to arrange the distance measuring points in the photographing field 132 as indicated by the points 121, 122, and 123 as illustrated on the right side of FIG. 10.

If the result detected by the vertical/lateral posture detection circuit 203 indicates the vertical posture and the print format selected by the format selection circuit 202 is the panorama size, the window selection circuit 206 is driven such that a distance measuring point located in the lower portion of the photographing scene is shifted toward the center of the scene (see the right side of FIG. 11).

Figure 12:
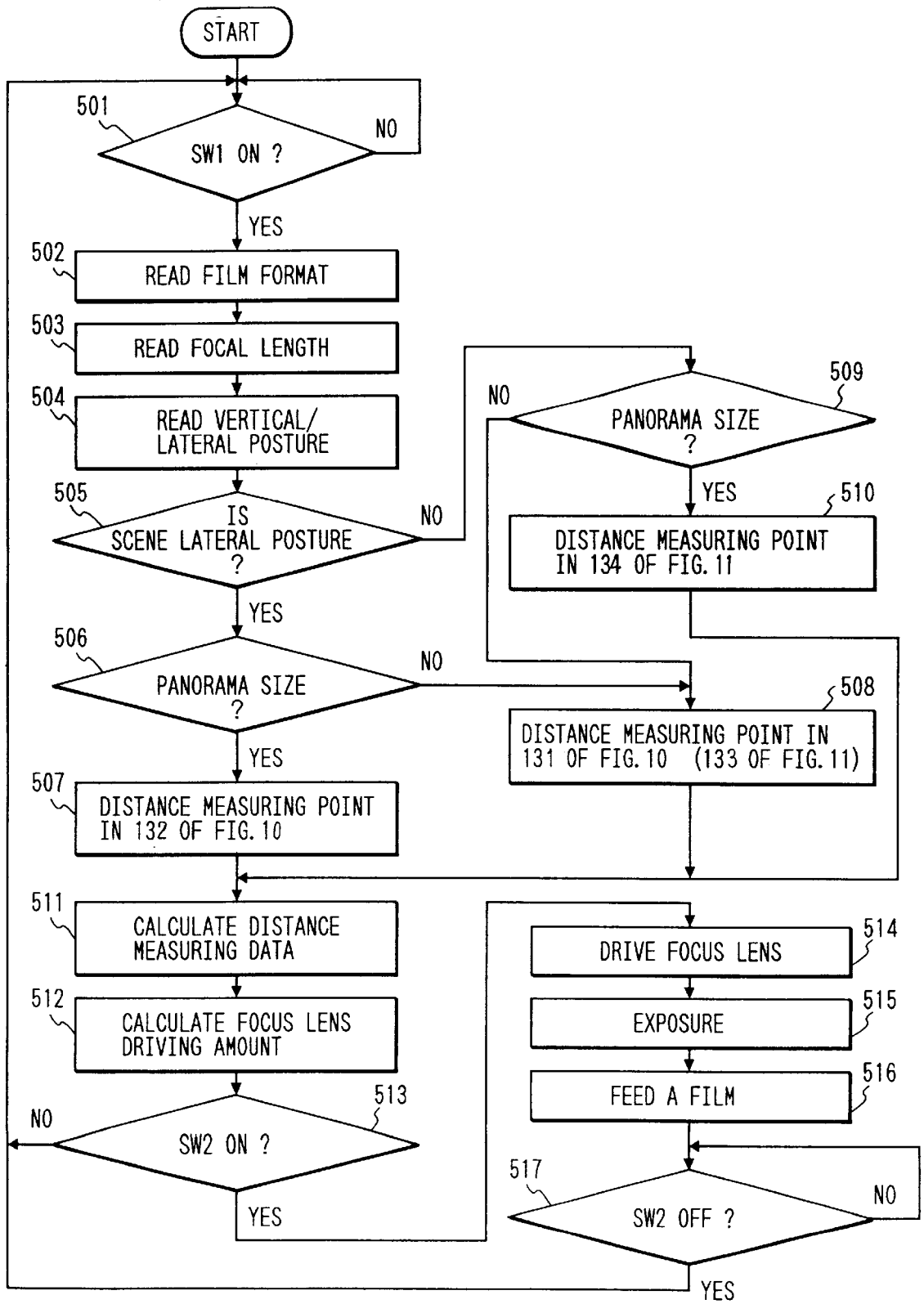
FIG. 12 is a flow chart showing a series of operations of the camera shown in FIG. 9.

Steps 501 to 517 of a flow chart shown in FIG. 12 explain a series of operations of the camera described above.

In this external measurement type passive distance measuring device according to the third embodiment, like in the second embodiment mentioned earlier, it is effective in decreasing the possibility of erroneous distance measurement to change the operation method (change the weighting) suitable for the characteristics of a format in accordance with the result selected by the format selection circuit 202.

According to the above embodiments, in the active distance measuring device, the light projection element select driving circuit 5 selectively drives proper light projection elements in accordance with the result selected by the format selection circuit 2, and, in the passive distance measuring device, the window selection circuit 206 selects an appropriate window in accordance with the result selected by the format selection circuit 202. This makes it possible to measure the distance to a position suitable for the print format selected, i.e., measure the distance to a position at which a probability of the presence of a principal object to be photographed is high in accordance with the print format selected. This effectively reduces a possibility of occurrence of a phenomenon in which a background rather than a principal object to be photographed is focused, i.e., a phenomenon so-called out of focus which often takes place in conventional devices.

In addition, the operation circuit performs weighting for distance measuring data suitable for the characteristics of a format in accordance with the result selected by the format selection circuit 102. This reduces the influence of distance measuring data of points except for a point of a principal object to be photographed, thereby effectively decreasing the possibility of erroneous distance measurement.

Furthermore, the influence of erroneous distance measurement can be further reduced by taking into account the influence inherent in photographing in a vertical posture.

This makes it possible to consistently measure the distance to an appropriate position in a photographing scene regardless of the selected print format, or to consistently calculate an optimal photographic lens driving amount by which a principal object to be photographed is focused regardless of the selected print format.

The present invention is also applicable to a device for obtaining defocus information for a plurality of portions in a scene in accordance with a TTL scheme.

In each of the above embodiments, the manner of distance measurement (including defocus detection; the same shall apply in the following description) or focus adjustment is changed in accordance with the print format. However, the print format can be changed in accordance with the manner of distance measurement or focus adjustment.

Also, warning can be performed without changing the manner of distance measurement or focus adjustment or the print format.

A camera according to the fourth embodiment of the present invention will be described below with reference to FIG. 13.

Figure 13:
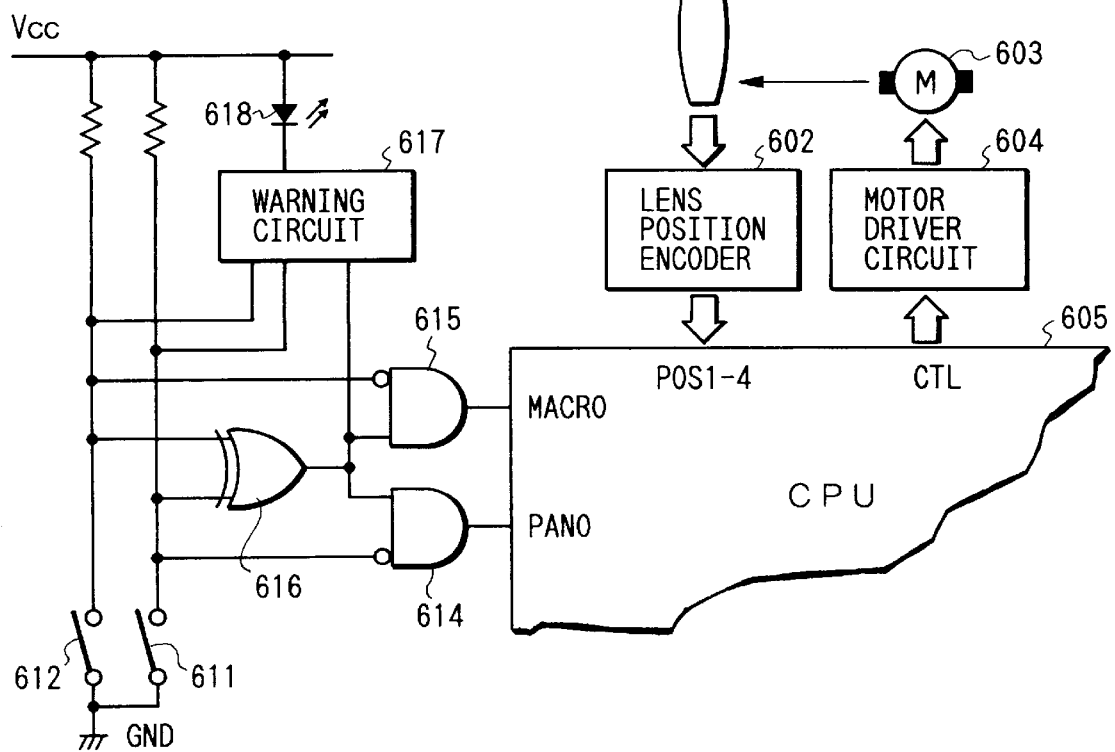
FIG. 13 is a block diagram showing an electrical arrangement of a camera according to the fourth embodiment of the present invention.

Referring to FIG. 13, this fourth embodiment includes a photographic lens 601, a lens position encoder 602, a lens driving motor 603, a motor driver circuit 604, a CPU (a microcomputer; to be abbreviated as a CPU hereinafter) 605 for controlling an operation sequence of the camera (not shown), a switch (to be abbreviated as an SW hereinafter) 611 interlocked with a standard/panorama select SW, an SW 612 interlocked with a macro photographing operation SW, AND gates 614 and 615, an XOR gate 616, a warning circuit 617, and a warning LED 618.

When a macro mode is not set, the SW 612 is open to apply an H-level signal to the inverting input terminal of the AND gate 615. When a panorama mode is not set, the SW 611 is open to apply an H-level signal to the inverting input terminal of the AND gate 614. Consequently, both outputs from the AND gates 614 and 615 are at level L. In this condition, the CPU performs a normal photographing operation in accordance with operations of a photographing button (not shown).

When the macro mode alone is set, the SW 612 is closed to apply an L-level signal to one input terminal of the XOR gate 616. Therefore, an output from the XOR gate 616 goes to level H, and so an H-level signal is output from the AND gate 615 to the CPU 605.

Upon detecting this H-level signal, the CPU outputs a control signal to the motor driver circuit 604 to drive the photographic lens 601 to a predetermined telephoto-side macro photographing position while monitoring a signal from the lens position encoder 602. If the macro mode is canceled, the SW 612 is opened to cause the AND gate 615 to output an L-level signal. Upon detecting this L-level signal, the CPU 605 outputs a control signal to the motor driver circuit 604 to drive the photographic lens 601 back to a predetermined standard photographing position while monitoring the signal from the lens position encoder 602.

When the panorama mode alone is set, on the other hand, the SW 611 is closed to apply an L-level signal to one input terminal of the XOR gate 616. Therefore, the output from the XOR gate 616 goes to level H, and so the AND gate 614 outputs an H-level signal to the CPU 605. If the macro mode is set in this state and consequently the SW 612 is closed, both the inputs to the XOR gate 616 go to level L, and this changes the output from the XOR gate 616 to level L. Therefore, both the outputs from the AND gates 614 and 615 go to level L, so the CPU 605 does not perform lens driving because it cannot detect setting of the macro mode. If the panorama mode is set after the macro mode is set, the output from the AND gate 615 changes from level H to level L. Consequently, as in the case in which the macro mode is canceled, the CPU 605 returns the photographic lens 601 to the predetermined standard photographing position. In this case, if both the SWs 611 and 612 are closed to set the output from the XOR gate 616 to level L, all inputs to the warning circuit 617 go to level L. The warning circuit 617 therefore drives the warning LED 618 to inform a photographer of the inadequate setting.

With the above arrangement, the panorama mode or the macro mode is not transmitted to the CPU 605 unless one of these modes is canceled. This makes it possible to prevent occurrence of a problem that a field viewed through a viewfinder is not photographed.

Figure 14:
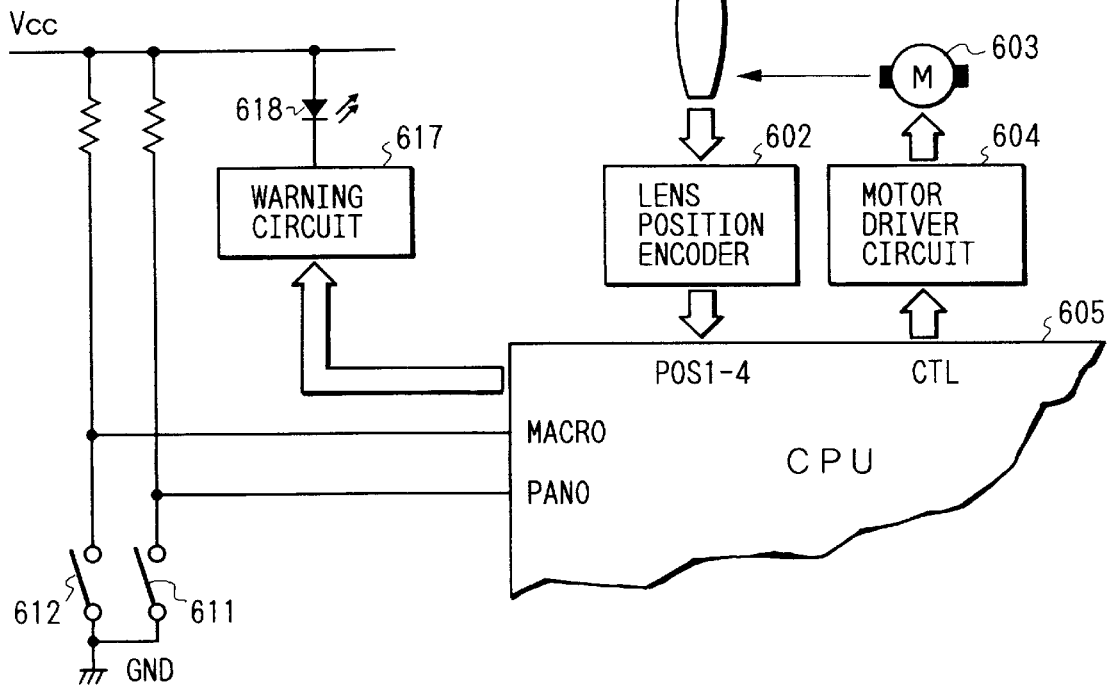
FIG. 14 is a block diagram showing an electrical arrangement of a camera according to the fifth embodiment of the present invention.
Figure 15:
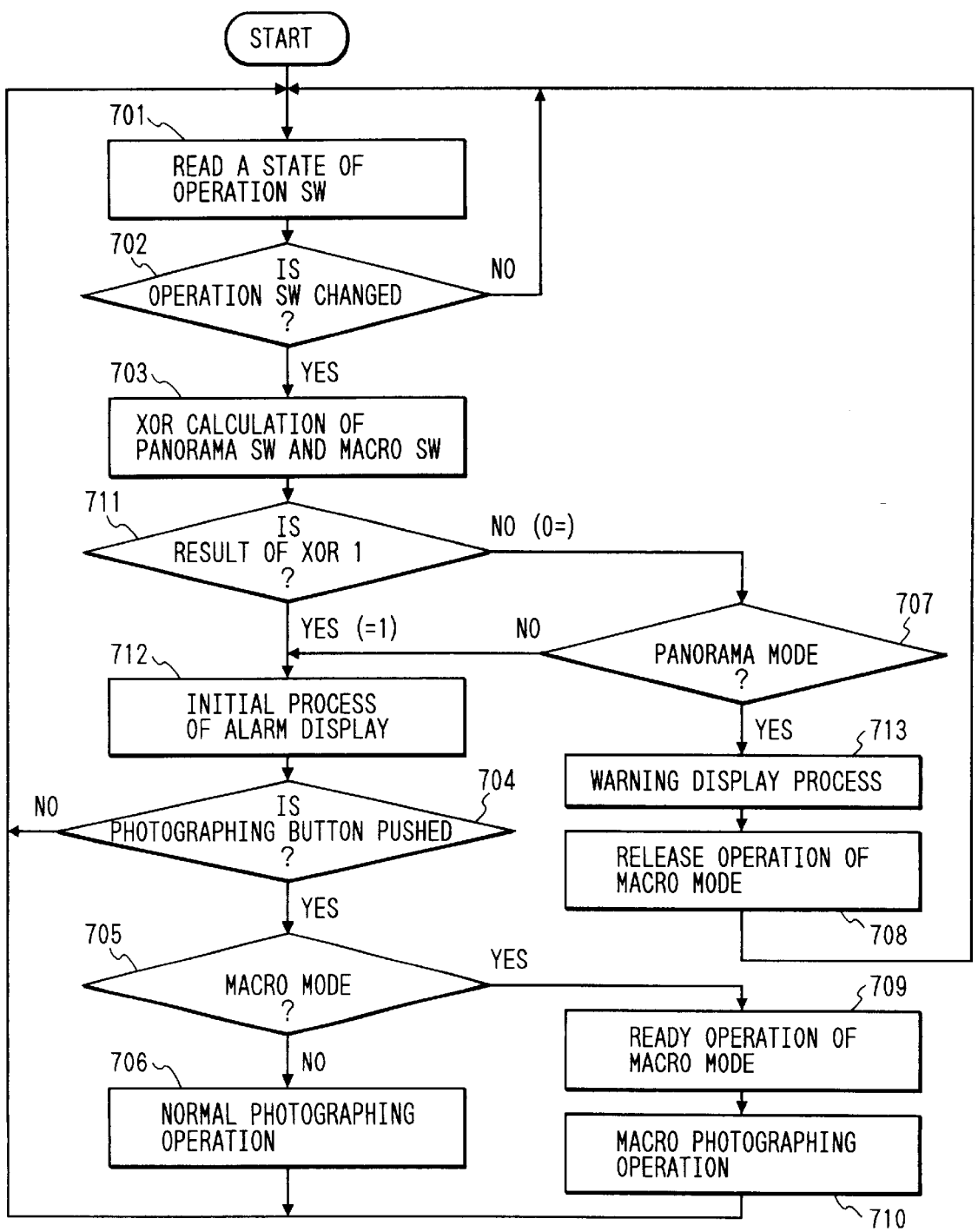
FIG. 15 is a flow chart showing a control operation performed by the camera having the arrangement shown in FIG. 14.
Figure 16:
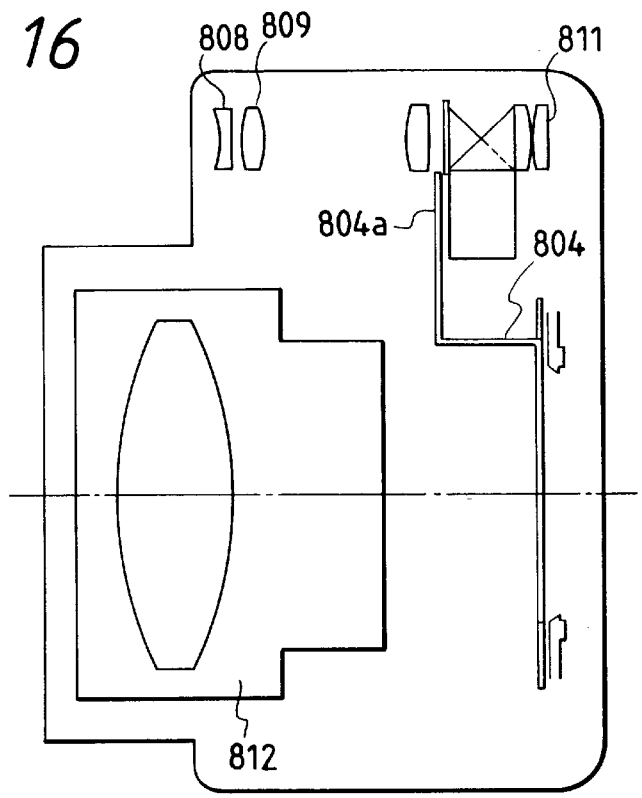
FIG. 16 is a side view showing an optical system in a normal photographing state.
Figure 17:
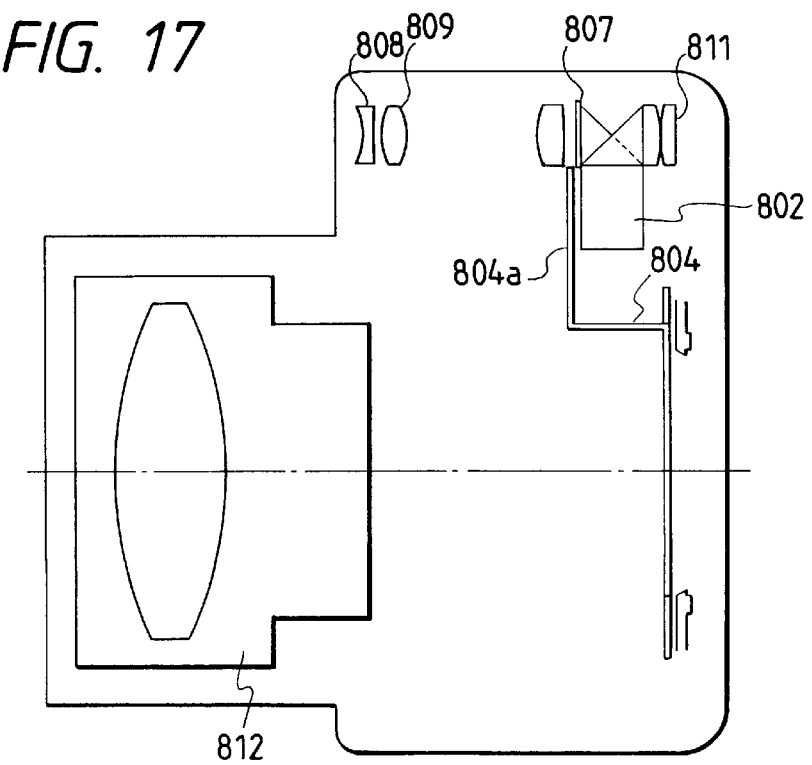
FIG. 17 is a side view showing the optical system in a macro photographing state.
Figure 18:
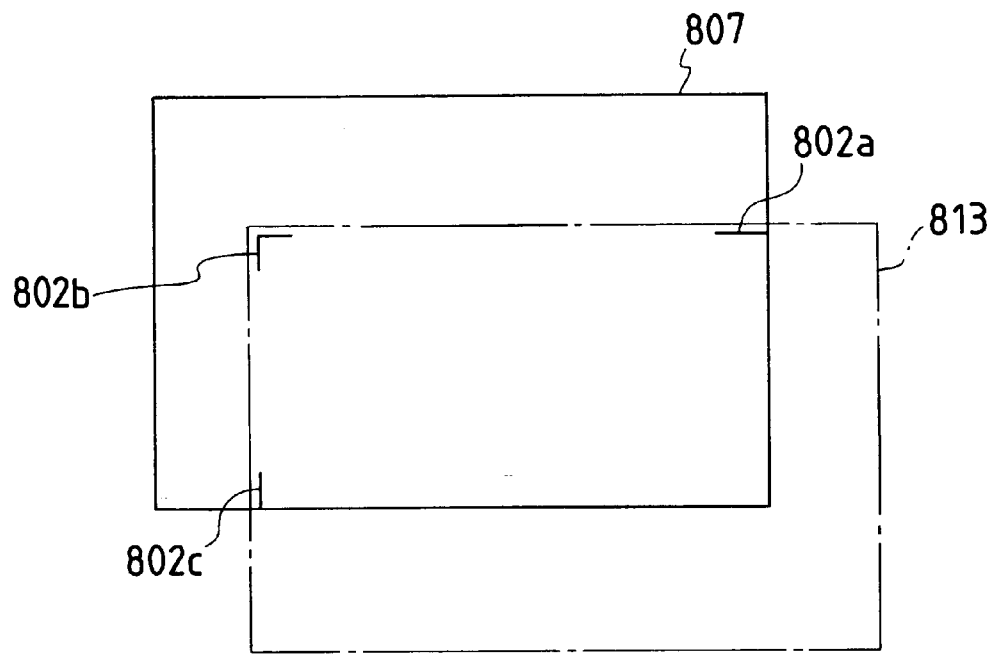
FIG. 18 is a view showing a viewfinder field in a normal state.
Figure 19:
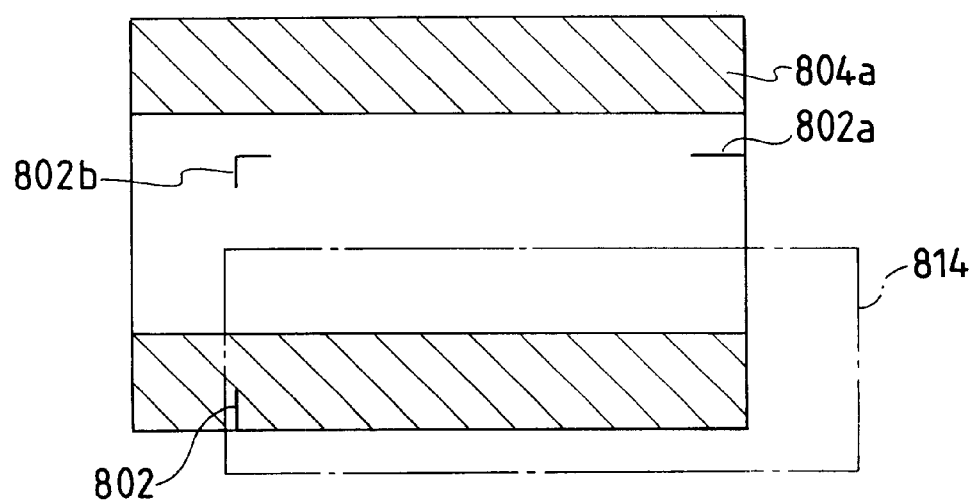
FIG. 19 is a view showing the field in a panorama state.

FIGS. 14 and 15 illustrate the fifth embodiment of the present invention.

The camera of the above embodiment is constituted by a simple logic circuit. As in this fifth embodiment shown in FIG. 14, however, it is also possible to omit this logic circuit and obtain a similar effect by using programs of a CPU. In FIG. 14, the same reference numerals as in FIG. 13 denote the same parts, and a detailed description thereof will be omitted.

FIG. 15 shows a flow chart of a control operation performed by a camera of this embodiment.

Referring to FIGS. 14 and 15, a CPU 605 reads the state of an operation SW in step 701 and checks in step 702 whether the state of the operation SW is changed by comparing this state with that of the operation SW which is stored beforehand in a RAM or the like. If the state of the operation SW is changed, the flow advances to step 703, and the CPU 605 performs an XOR operation for the state of an operation SW for a panorama mode and the state of an operation SW for a macro mode. Subsequently, in step 711, the CPU 605 checks whether the result of this XOR operation is 1.

If the result of the XOR operation is not 1, the CPU 605 executes an initial process of warning display in step 712. Thereafter, the flow advances to step 704, and the CPU 605 checks whether a photographing button is pushed. If the photographing button is not pushed, the flow returns to step 701. If the photographing button is pushed, the flow advances to step 705, and the CPU 605 checks whether the macro mode is set. If the macro mode is not set, the CPU 605 executes a normal photographing operation in step 706, and the flow returns to the loop of repeating steps 701 and 702. If the macro mode is set, the flow advances to step 709, and the CPU 605 performs a ready operation of the macro mode, such as driving of a photographing optical system. The flow then advances to step 710 to execute the macro photographing operation.

If the CPU 605 detects in step 711 that the result of the XOR operation is 1, the flow advances to step 707, and the CPU 605 checks whether the panorama mode is set. If the panorama mode is not set, the CPU 605 executes the initial process of warning display in step 712. Thereafter, the flow advances to step 704 to perform the normal photographing operation as described above. If the panorama mode is set, the CPU 605 performs a warning display process in step 713, warning that both the panorama and macro modes are set. The flow then advances to step 708, and the CPU 605 executes a release operation of the macro mode. This release operation may be either initialization of, e.g., a RAM, or actual driving of, e.g., the photographic lens. Thereafter, the loop of steps 701 and 702 is repeatedly executed. As a consequence, photographing is inhibited while the panorama and macro modes are simultaneously set.

With the above operation, it is possible to prevent occurrence of a problem that a field viewed through a viewfinder is not photographed.

In addition to the above embodiment, it is also possible to modify the arrangement such that the panorama mode SW and the macro mode SW can be operated in only a mechanical XOR manner.

According to the embodiments shown in FIGS. 13 to 15 as described above, there can be provided a camera including a means for detecting setting of a panorama mode, a means for detecting setting of a macro mode, and an XOR means for XORing output signals from these detecting means, wherein a photographing mode is determined in accordance with an output from the XOR means, thereby preventing taking of a photograph that is largely different from the photographic purpose of a photographer.

In the embodiments shown in FIGS. 13 to 15, the panorama mode is set by manually moving a light-shielding frame to shield a photographing aperture and a viewfinder. Therefore, in setting or releasing the panorama mode, the light-shielding frame is not operated automatically, unlike driving of the photographic lens in the macro mode. It is, however, also possible move the light-shielding frame by using a motor or the like in response to setting or release of the panorama mode, like in the case of the macro mode.

In the embodiments shown in FIGS. 13 to 15, photographing itself is inhibited if the panorama and macro modes are set simultaneously. However, it is also possible to perform only warning without inhibiting photographing. Alternatively, either the panorama or macro mode also can be selected preferentially if the two modes are set simultaneously.

In the embodiments shown in FIGS. 13 to 15, the present invention is similarly applicable to a photographing operation within a predetermined distance range or another operation not limited to photographing as well as the macro mode.

In all of the above embodiments, print formats are not limited to a full size and a panorama size but may be some other sizes.

In addition, a print format can also be simply designated to a laboratory.

Furthermore, in each of the above embodiments, the device capable of measuring or operating the distances to a plurality of positions in a scene, the device for macro photographing, the device for selecting a print format, and the like are incorporated in a camera. However, it is also possible to externally attach these devices as adapters. In this case, a means for obtaining connections between the camera and the adapters like in the above embodiments is provided in either the camera or the adapters.

Also, the above embodiments can be combined as needed.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims

What is claimed is:

1. A camera comprising:
a) a first input device which inputs an information relating to a focal length of an optical system;
b) a second input device which inputs an information of a scene size which should be printed;
c) an information forming device capable of performing distance measurement or focus detection with respect to each of targets set in a plurality of different areas in the scene, and capable of forming an information for focus adjustment with respect to each of areas; and
d) a selection device which selects a predetermined area from among said plurality of areas on the basis of the information of said first input device and said second input device, said selection device selecting the predetermined area in accordance with the information related to the focal length in a state that the scene size is set to a first size, and selecting an area under a selecting condition different from that in the state the scene size is set to the first size, in accordance with the information related to the focal length in a state that the scene size is set to a second size,
wherein said information forming device performs the distance measurement or focus detection with respect to only the area selected by said selection device.

2. A camera according to claim 1, wherein said second input device comprises means for selecting the scene size which should be printed.

3. A camera comprising:
a) a first input device for inputting an information indicating whether a scene of the camera is in a vertical posture or in a lateral posture;
b) a second input device for inputting an information relating to a focal length;
c) an information forming device for performing distance measurement or focus detection with respect to each of targets set in a plurality of different areas in the scene, and forming an information for focus adjustment with respect to each of areas; and
d) a selection circuit for selecting a measured distance result or detected focus result in a predetermined area from among the results in the plurality of areas on the basis of the informations of said first input device and said second input device.

4. A camera according to claim 3, wherein said information forming device comprises means for changing the plurality of target directions in accordance with the information of said first and said second input devices.

5. A camera according to claim 3, wherein said information forming device comprises means for changing a manner of the formation of the information relating to the focus adjustment on the basis of the plurality of target directions in accordance with the information of said first and second input devices.

6. A camera comprising:
a) a first input device for inputting an information indicating whether a scene of the camera is in a vertical posture or in a lateral posture;
b) a second input device for inputting an information relating to a focal length;
c) an information forming device for performing distance measurement or focus detection with respect to each of targets set in a plurality of different areas in the scene, and forming an information for focus adjustment with respect to each of the areas; and
d) a warning device for warning in accordance with the information of said first input device, said second input device and said information forming device.

7. A camera comprising:
a) a first input device for inputting information whether a photographing mode is a macro photographing mode in which a photographing lens is moved to a predetermined macro position or a normal photographing mode;
b) a second input device for inputting information of a scene which should be printed; and
c) a warning device for warning when said first input device inputs the information that the photographing mode is the macro photography mode and said second input device inputs the information of a predetermined scene size.

8. An apparatus adapted to a camera, comprising:
a) a first input device which inputs an information relating to a focal length of an optical system;
b) a second input device which inputs information of a scene size which should be printed;
c) an information forming device capable of performing distance measurement or focus detection with respect to each of targets set in a plurality of different areas in the scene, and capable of forming an information for focus adjustment with respect to each of the areas; and
d) a selection device which selects a predetermined area from among said plurality of areas on the basis of the information of said first input device and said second input device, said selection device selecting the predetermined area in accordance with the information related to the focal length in a state that the scene size is set to a first size, and selecting an area under a selecting condition different from that in the state the scene size is set to the first size, in accordance with the information related to the focal length in a state that the scene size is set to a second size;
wherein said information forming device performs the distance measurement or focus detection with respect to only the area selected by said selection device.

9. A camera comprising:
a) a focal length detection circuit which detects a focal length information of a zoom lens;
b) a size information setting circuit which sets a size information of a scene which should be printed;
c) a distance measurement circuit capable of performing a distance measurement independently with respect to a plurality of different areas in the scene; and
d) a selection circuit which selects a predetermined area from among the plurality of areas on the basis of said focal length information and said size information, said selection circuit selecting the predetermined area in accordance with the information related to the focal length in a state that the scene size is set to a first size, and selecting an area under a selecting condition different from that in the state the scene size is set to the first size, in accordance with the information related to the focal length in a state that the scene size is set to a second size,
wherein said distance measurement circuit performs the distance measurement with respect to only the area selected by said selection circuit.

10. A camera according to claim 9, wherein the first size is a size suitable for a panorama photograph.

11. A camera comprising:
  a) a focal length detection circuit which detects a focal length information of a zoom lens;
  b) a posture detection circuit which detects whether a photographing posture is vertical or lateral;
  c) a distance measurement circuit which performs a distance measurement or a focus detection, independently with respect to a plurality of different areas in the scene; and
  d) a selection circuit which selects the distance measurement result or the focus detection result of a predetermined area from among the results of the plurality of areas on the basis of said focal length information and the detected result of said posture detection circuit, said selection circuit selecting the distance measurement result or the focus detection result of a predetermined area on the basis of an information related to the focal length in case that the photographing posture is lateral, and selecting the distance measurement result or the focus detection result of a predetermined area under a selecting condition different from that in case that the photographing posture is lateral, on the basis of an information related to the focal length in case that the photographing posture is vertical.

12. A camera comprising:
  a) a mode setting member which sets a macro mode;
  b) a size setting member which sets a size of a scene which should be printed, independently with respect to said macro setting member;
  c) a circuit which performs a drive of a lens in the macro mode upon setting the macro mode by said macro setting member when a first size is set by said size setting member, and which inhibits the drive of the lens in the macro mode even if said macro mode setting member is operated when a second size is set by said size setting member.

13. A camera according to claim 12, wherein said second size is a panorama size.

14. A camera comprising:
  a) a mode setting circuit which sets a macro mode in which a lens is moved to a macro photographing position;
  b) a size setting circuit which sets a size of a scene which should be printed; and
  c) a control circuit which cancels the macro mode when said size setting circuit sets a predetermined size upon setting the macro mode.

15. A camera according to claim 14, wherein said control circuit moves the lens from the macro photographing position to a normal photographing position.

16. A camera according to claim 14, wherein said predetermined size is a panorama size.

* * * * *